US009796406B2

(12) United States Patent
Takagi et al.

(10) Patent No.: US 9,796,406 B2
(45) Date of Patent: Oct. 24, 2017

(54) ELECTRIC POWER STEERING UNIT WITH OFFSET LINK MECHANISM

(71) Applicant: Kubota Corporation, Osaka-shi (JP)

(72) Inventors: Hiroshi Takagi, Sakai (JP); Hiroki Bessho, Sakai (JP); Takafumi Komatsu, Sakai (JP); Kensuke Okabe, Sakai (JP); Takeshi Satozono, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/165,005

(22) Filed: May 26, 2016

(65) Prior Publication Data

US 2017/0001658 A1    Jan. 5, 2017

(30) Foreign Application Priority Data

Jul. 2, 2015   (JP) .................................. 2015-133948
Jul. 6, 2015   (JP) .................................. 2015-135510

(51) Int. Cl.
*B62D 5/04*      (2006.01)
*B62D 25/12*     (2006.01)
*B60R 16/02*     (2006.01)

(52) U.S. Cl.
CPC ........ *B62D 5/0409* (2013.01); *B60R 16/0215* (2013.01); *B62D 25/12* (2013.01)

(58) Field of Classification Search
CPC .................................................. B62D 5/0409
See application file for complete search history.

(56) References Cited

U.S. PATENT DOCUMENTS

| 7,497,299 | B2 * | 3/2009 | Kobayashi | B62D 1/16 180/444 |
| 8,079,602 | B2 * | 12/2011 | Kinsman | B60G 15/063 280/5.512 |
| 8,720,299 | B2 | 5/2014 | Nakamura et al. | |
| 2016/0347350 | A1 * | 12/2016 | Heon | B62D 3/12 |

FOREIGN PATENT DOCUMENTS

| JP | 201211800 A | 1/2012 |
| JP | 2012117384 A | 6/2012 |

* cited by examiner

*Primary Examiner* — Kevin Hurley
(74) *Attorney, Agent, or Firm* — The Webb Law Firm

(57) ABSTRACT

Disclosed is a vehicle including a steering wheel arranged offset toward one side in a vehicle body right/left direction, and an electric power steering unit. The electric power steering unit includes a link mechanism operably connected to the steering wheel and extending from a right/left center side of the steering wheel toward a vehicle body right/left center side to be operably connected to a wheel side, an assist device for the link mechanism, a control lever arranged adjacent the vehicle body right/left center in the vicinity of the steering wheel, a rotation shaft operably connected to the control lever to be rotated about a right/left axis that extends in the vehicle body right/left direction, and a control cable operably connected to the rotation shaft. A base end portion of the control cable is more offset toward the one side than the assist device.

7 Claims, 9 Drawing Sheets

ELECTRIC POWER STEERING UNIT WITH OFFSET LINK MECHANISM

CROSS-REFERENCE TO RELATED APPLICATIONS

This application claims priority to Japanese Patent Application Nos. 2015-133948 filed Jul. 2, 2015 and 2015-135510 filed Jul. 6, 2015, the disclosures of which are hereby incorporated in their entirety by reference.

BACKGROUND OF THE INVENTION

1. Field of the Invention

The present invention relates to a vehicle, and in particular to a work vehicle.

2. Description of the Related Art (1) First Related Art

An example of art related to a vehicle is disclosed in JP 2012-011800 A. This vehicle includes: a steering wheel for performing steering operations and arranged offset toward one side in the right/left direction of the vehicle relative to the right/left center of the vehicle; and a hydraulic power steering unit operable to assist operation of the steering wheel. The hydraulic power steering unit includes: a hydraulic controller that is arranged directly under the steering wheel; and hydraulic hoses ("pump-side hydraulic hose" and "cylinder-side hydraulic hose" in JP 2012-011800 A) that extend downward from the hydraulic controller.

However, with this hydraulic power steering unit, driving is performed using hydraulic fluid, and thus there are disadvantages such as that there is a risk of fluid leaking from the hydraulic hoses, and maintenance is not very favorable. In order to avoid such disadvantages, consideration has been given to employing an electric power steering unit that does not use hydraulic fluid, instead of a hydraulic power steering unit.

However, an electric power steering unit has a very different basic structure from a hydraulic power steering unit, and therefore if the arrangement of the operation system in the hydraulic power steering unit is used as-is when employing an electric power steering unit, there is a risk that the electric power steering unit and the operation system will interfere with each other.

In light of this, there is need for the provision of a vehicle in which an electric power steering unit can be favorably arranged in a state in which interference with the operation system is avoided.

(2) Second Related Art

An example of art related to a connector device that includes a protective structure is disclosed in JP 2012-117384 A. The structure disclosed in JP 2012-117384 A includes a harness ("harness assembly" in JP 2012-117384 A) that has a connector portion ("harness connector" in JP 2012-117384 A).

However, the connector portion of the harness is exposed, and the connector portion is not sufficiently protected against heat, water and the like. In the case of providing protection for such a connector portion, it is common to use a cover that is specially molded to match the shape of the connector portion, and this has led to a rise in production cost.

In light of this, there is need for a connector device that has a low production cost and can favorably protect the connector portion. There is also desire for a work vehicle that includes such a connector device.

SUMMARY OF THE INVENTION (1) In light of the "First Related Art", the following is provided in the present invention.

A vehicle comprising:
  a steering wheel arranged offset toward one side in a vehicle body right/left direction relative to a vehicle body right/left center; and
  an electric power steering unit operable to assist operation of the steering wheel, the electric power steering unit including:
    a link mechanism operably connected to the steering wheel, the link mechanism extending from a right/left center side of the steering wheel toward a vehicle body right/left center side to be operably connected to a wheel side,
    an assist device operable to supply assistive motive power to the link mechanism in accordance with operation of the steering wheel,
    a control lever arranged adjacent the vehicle body right/left center in a vicinity of the steering wheel,
    a rotation shaft operably connected to the control lever to be rotatable about a right/left axis that extends in the vehicle body right/left direction, and
    a control cable operably connected to the rotation shaft, a base end portion of the control cable being more offset toward the one side in the vehicle body right/left direction than the assist device.

According to this configuration, assistive motive power is supplied by the assist device to the link mechanism that is operably connected to the steering wheel and also operably connected to the wheel side, whereby the electric power steering unit assists operation of the steering wheel. The link mechanism extends from the right/left center side of the steering wheel toward the vehicle body right/left center side, and the control lever is arranged adjacent the vehicle body right/left center in the vicinity of the steering wheel. In other words, the control lever is arranged on the same side of the steering wheel as the side on which the link mechanism extends from the steering wheel. For this reason, if the control cable operably connected to the control lever is arranged so as to extend directly under the control lever, there is a risk of the control cable interfering with the assist device that supplies assistive motive power to the link mechanism.

However, the rotation shaft operable to rotate about the right/left axis that extends in the vehicle body right/left direction is operably connected to the control lever; and the control cable is operably connected to that rotation shaft. And, the base end portion of the control cable is more offset toward the one side in the vehicle body right/left direction than the assist device. Accordingly, the control cable is located at a position distant from the assist device, and interference is not likely to occur between the control cable and the assist device.

Accordingly, the electric power steering unit can be favorably arranged, while avoiding interference with the operation system.

In a preferred embodiment, the rotation shaft extends in the vehicle body right/left direction across the link mechanism in a vicinity of the link mechanism.

According to this configuration, the rotation shaft operably connected to the control lever extends laterally in the vicinity of the link mechanism of the electric power steering unit. Therefore, the base end portion of the control cable that is operably connected to the rotation shaft is located on the side opposite to the side on which the link mechanism extends from the steering wheel. Thus, it is possible to avoid interference between the control cable and the link mechanism.

In a preferred embodiment, the vehicle further comprises a frame body that rotatably supports the rotation shaft, the link mechanism being arranged to pass through a space between the rotation shaft and the frame body.

According to this configuration, the rotation shaft operably connected to the control lever is supported by the frame body, and a gap or space is formed between the rotation shaft and the frame body. This gap provides a space for extending the link mechanism of the electric power steering unit therethrough. Accordingly, it is possible to achieve a compact arrangement in which interference is avoided between the rotation shaft operably connected to the control lever, and the link mechanism of the electric power steering unit.

In a preferred embodiment, the vehicle further comprises a rack and pinion mechanism that is linked to the link mechanism and is operably connected to an axle of the vehicle, the control cable passing through a space rearward of the rack and pinion mechanism.

According to this configuration, the control cable is arranged so as to pass through a location rearward of the rack and pinion mechanism, and therefore it is possible to favorably avoid interference between the control cable and the rack and pinion mechanism.

In a preferred embodiment, the link mechanism includes a plurality of link members that are operably connected via a universal joint, the plurality of link members include a first link member that is operably connected to a rotation operation shaft of the steering wheel, and a second link member that is operably connected to a lower end portion side of the first link member, and the assist device is located below the first link member and is configured to supply assistive motive power to the second link member.

According to this configuration, in the electric power steering unit, assistive motive power is supplied by the assist device to the second link member that is operably connected to the lower end portion side of the first link member. Also, the entirety of the link mechanism extends from the right/left center side of the steering wheel toward the vehicle body right/left center side, and therefore the assist device can be arranged more distant from the control cable that is linked to the control lever, compared to the case in which assistive motive power is supplied by the assist device to the first link member. For this reason, it is possible to favorably avoid interference between the assist device and the control cable.

In a preferred embodiment, the assist device includes an electric motor and a control device that controls the electric motor, and the electric motor and the control device are arranged on a side of the link mechanism that is opposite to the control cable.

According to this configuration, the electric motor and the control device of the assist device are arranged on the side of the link mechanism that is opposite to the control cable operably connected to the control lever, and therefore it is possible to prevent the control cable from interfering with the electric motor and the control device.

In a preferred embodiment, the vehicle further comprises:
a front hood;
a driver panel located rearward of the front hood, the control device being arranged under the driver panel; and
a cover that covers the control device.

This configuration has advantages such as the following. There is a risk of water and the like intruding into the region under the front hood due to mud spattering and the like during traveling of the traveling vehicle body. The control device of the assist device is arranged in this region under the front hood. However, the control device is covered with the cover, and therefore it is possible to prevent water and the like from coming into contact with the control device.

(2) In light of the "Second Related Art", the following is provided in the present invention.

A connector device comprising:
a harness, the harness having an electrical wire portion mostly covered with a sheath member, and a connector portion formed at a tip end of a portion of the electrical wire portion that is not covered with the sheath member;
a protective member that covers an outer peripheral side of the connector portion, and has heat resistance and flexibility;
an abutting portion in which portions of the protective member on a sheath member side are caused to abut against each other while forming a shortcut; and
a fixing member that fixes the abutting portion to the sheath member.

According to this configuration, the outer peripheral side of the connector portion is covered with the tubular protective member that has heat resistance, and therefore it is possible to favorably protect the connector portion from heat, water and the like. Moreover, due to having heat resistance, the protective member does not deform due to heat like a heat-shrinking tube does, and can be used without problems even in a high-temperature environment. Also, due to having heat resistance, the protective member is not likely to undergo degradation such as whitening due to the influence of heat or the like. Furthermore, the abutting portion of the protective member, in which portions of the protective member on the sheath member side are caused to abut against each other while forming a shortcut, is fixed to the sheath member by the fixing member. For this reason, the protective member can be produced with little labor and with use of a general-purpose member operable to be obtained inexpensively, and it is possible to avoid a rise in production cost that occurs in the case of using a cover that is specially molded to match the shape of the connector portion.

Accordingly, the production cost is low, and it is possible to favorably protect the connector portion.

In a preferred embodiment, the abutting portion is formed by folding a portion of the protective member on the sheath member side.

According to this configuration, a portion of the protective member on the sheath member side is folded so as to cause portions thereof to abut against each other while forming a shortcut, and the thus-obtained abutting portion is fixed to the sheath member by the fixing member. For this reason, there is no need for special processing such as providing a cutout in the protective member, the number of production steps is low, and the amount of production labor can be reduced.

In a preferred embodiment, the protective member is constituted by a cylindrical member.

According to this configuration, the protective member is constituted by a cylindrical member that has heat resistance and flexibility, and this protective member can be obtained more inexpensively than a protective member that is constituted by a member that has heat resistance and flexibility and has a non-cylindrical shape such as a quadrangular tube shape. For this reason, it is possible to suppress production expense.

In a preferred embodiment, the fixing member is constituted by adhesive tape that has heat resistance and flexibility.

According to this configuration, fixing by adhesive tape can be easily undone by merely peeling off the adhesive tape, unlike the case of fixing by welding. For this reason, in the case where the protective member needs to be replaced, the protective member can be easily replaced by removing and attaching the adhesive tape. Also, by using adhesive tape that has heat resistance, it is possible to make it unlikely for the adhesive tape to undergo degradation due to heat or the like.

The present invention is also directed to a work vehicle in which a connector device having any of the above configurations is provided at a location in the vicinity of the engine. This has advantages such as the following.

The vicinity of the engine is an environment that is likely to be exposed to heat from the engine and water during vehicle washing or the like. By applying the connector device of the present invention in such an environment, it is possible to realize a high level of quality in which inconveniences such as failure of the electrical system are not likely to occur, and it is possible to suppress the overall production cost.

Other features and advantageous effects exhibited by such features will become apparent from a reading of the following description with reference to the accompanying drawings.

DESCRIPTION OF THE PREFERRED EMBODIMENTS

Figure 1:
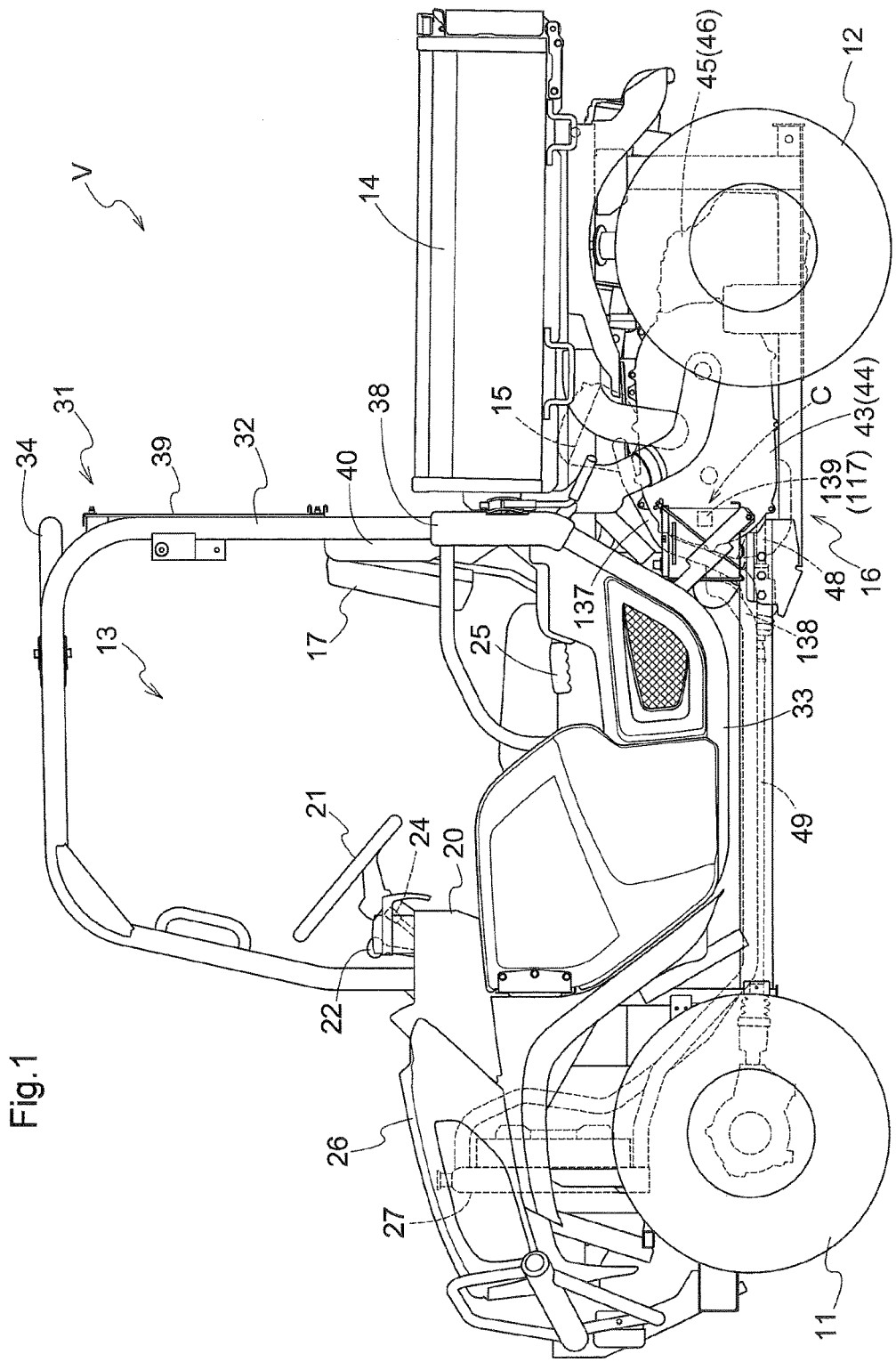
FIG. 1 is a left side view of a multipurpose vehicle (utility vehicle).

An embodiment of the present invention will be described hereinafter with reference to FIGS. 1 to 11.
Overall Configuration
With reference to FIGS. 1 and 2, an illustrated multipurpose vehicle (utility vehicle—an example of a "vehicle" or a "work vehicle") is used for various applications such as load transportation and recreation. The multipurpose vehicle includes: a pair of right and left front wheels 11 (one example of a "wheel") that are steerable and drivable; a pair of right and left rear wheels 12 that are drivable; and a traveling vehicle body operable to travel using the right and left front wheels 11 and the right and left rear wheels 12. A driver section 13 is provided in a fore/aft intermediate portion of the traveling vehicle body. A loading platform 14 is provided rearward of the driver section 13 in the traveling vehicle body. A motor section 16 having an engine 15, etc. is provided below the loading platform 14 in the traveling vehicle body.

The driver section 13 includes: a driver seat 17 on which an operator sits; a passenger seat 18 that is arranged laterally adjacent to the driver seat 17 and on which a passenger can sit; a boarding step 19 that serves as a foothold; a driver panel 20 provided with various types of devices and instruments, etc. The driver section 13 also includes, each as an operational component, a steering wheel 21 for performing steering operations; a speed change lever 22 (one example of an "control lever") for performing speed change operations; an electric power steering unit 23 operable to assist operation of the steering wheel 21; a tilt lever 24 for changing the angular orientation of the steering wheel 21; a parking brake 25 that is arranged adjacent to the driver seat 17 on the side remote from the passenger seat 18, etc. Each of the steering wheel 21 and the speed change lever 22 extends through the driver panel 20.

Figure 5:
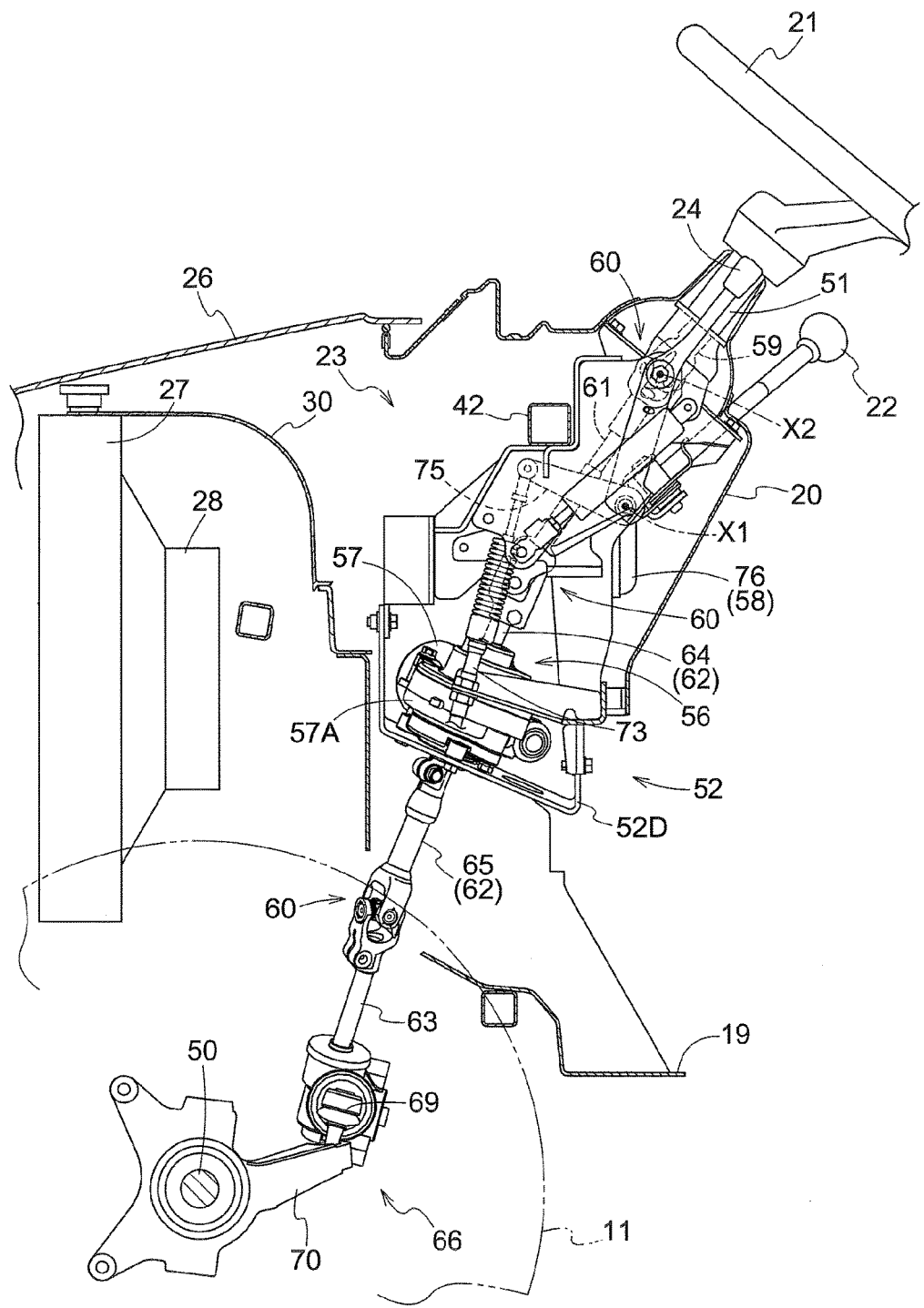
FIG. 5 is a view in vertical section of the region including the electric power steering unit, as seen from the left side.
Figure 6:
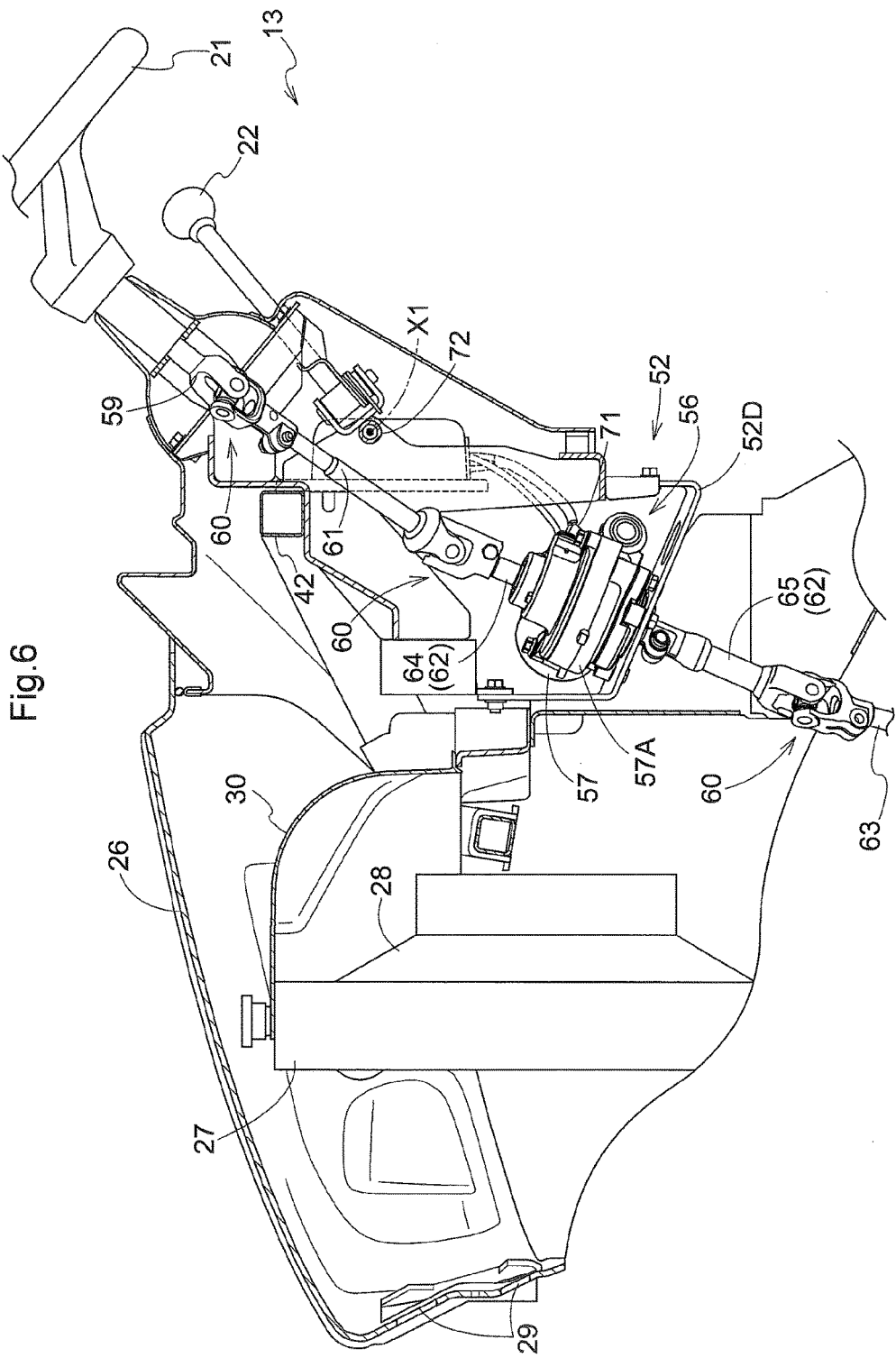
FIG. 6 is a view in vertical section of the region including the electric power steering unit, as seen from the right side.

An openable/closable front hood (front lid) 26 is provided in front of the driver section 13. As shown in FIGS. 1, 5, and 6, a radiator 27 for cooling a coolant for the engine 15 is arranged under the front hood 26. A fan (not shown) and a fan shroud 28 that covers the fan are provided rearward of the radiator 27. By driving the fan, outside air is sucked in through an air vent portion 29 formed in the front hood 26, and thus the radiator 27 is cooled. A radiator cover 30 is supported rearward of the radiator 27. The radiator cover 30 is configured to prevent the air that cooled the radiator 27 from flowing toward the driver section 13.

Figure 2:
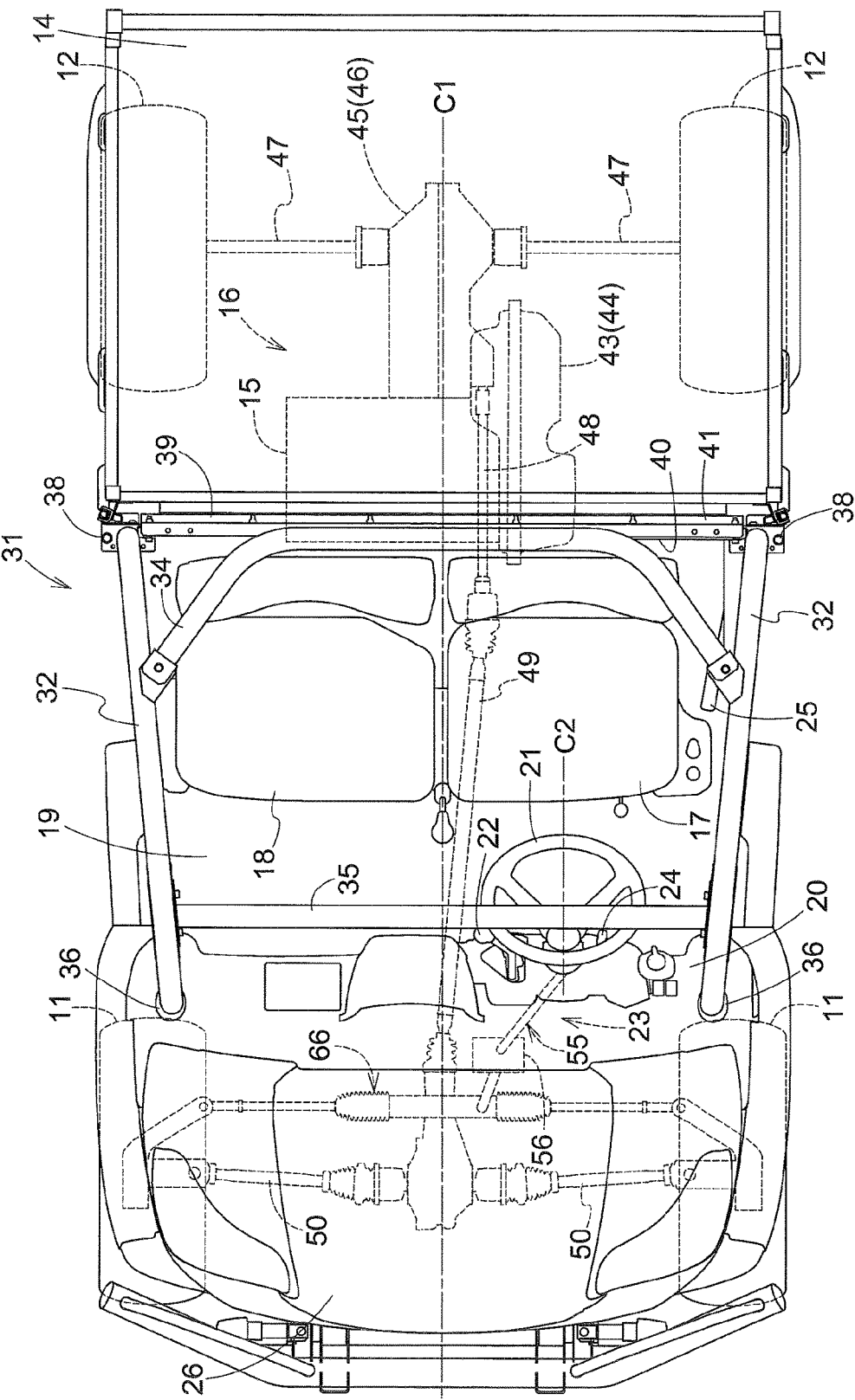
FIG. 2 is a plan view of the multipurpose vehicle.

As shown in FIGS. 1 and 2, the driver section 13 is surrounded by a protection framework 31 to protect the driver section 13. The protection framework 31 includes: a pair of right and left upper frames 32 that are shaped as an upside-down "U" in a side view; and a pair of right and left lower frames 33 that are shaped as a "U" in a side view. The upper frames 32 and the lower frames 33 are each constituted by a pipe frame. The protection framework 31 further includes: a lateral upper front frame 35 interconnecting the front upper portions of the right and left upper frames 32; a lateral upper rear frame 34 interconnecting the rear upper portions of the right and left upper frames 32; front joining members 36 that join the forward lower end portions of the upper frames 32 to the forward upper end portions of the lower frames 33, respectively; and rear joining members 38 that join the rearward lower end portions of the upper frames 32 to the rearward upper end portions of the lower frames 33, respectively. Rearward of the driver seat 17 and between the right and left upper frames 32, there are provided a vertical window member 39 having surfaces thereof facing forward and rearward, and a vertical protection panel 40 having surfaces thereof facing forward and rearward. A lateral frame 41 constituted by a lateral pipe frame is provided so as to span the lower end portions of the right and left rear joining members 38. Further, a lateral frame 42 (see FIGS. 4 to 6) extends in the vehicle lateral direction for interconnecting the right and left front joining members 36 as shown in FIG. 2. The lateral frame 42 is located under the driver panel 20.

The loading platform 14 shown in FIGS. 1 and 2 is switchable between a loading state in which a load can be placed on the loading platform 14, and a dumping state in which the load can be discharged. By swinging the loading platform 14 about a lateral axis, the loading platform 14 can raise its front end portion and enter the dumping state in which the load can be discharged from the rear end portion side. The state of the loading platform 14 can be changed by driving a hydraulic actuator, for example.

In the present embodiment, "one side in the vehicle body right/left direction" corresponds to the left side of the vehicle, and "other side in the vehicle body right/left direction" corresponds to the right side of the vehicle.

As shown in FIG. 2, the motor section 16 includes: the engine 15; a belt-type stepless transmission 44 that is housed in a housing body 43; and a gear-type transmission 46 that is housed in a transmission case 45. As understood from FIG. 2, motive power from the engine 15 is inputted to the belt-type stepless transmission 44 and steplessly increased/decreased in accordance with the rotation speed of the engine 15. Motive power from the belt-type stepless transmission 44 is then outputted to the gear-type transmission 46. In accordance with an operation acting on the speed change lever 22, the gear-type transmission 46 can realize a forward travel state (forward first speed state and forward second speed state) in which motive power inputted from the belt-type stepless transmission 44 is converted into forward travel motive power and then outputted; a rearward travel state in which motive power inputted from the belt-type stepless transmission 44 is converted into rearward travel motive power and then outputted; and a neutral state in which motive power inputted from the belt-type stepless transmission 44 is not transmitted. The motive power from the gear-type transmission 46 is transmitted to a rear axle 47, and then transmitted from the rear axle 47 to the right and left rear wheels 12. Also, the motive power from the gear-type transmission 46 is transmitted to a front axle 50 via a power takeoff shaft 48, a propeller shaft 49, etc., and can be transmitted from the front axle 50 to the right and left front wheels 11. The power takeoff shaft 48 is located below the engine 15. When a clutch mechanism (not shown) provided in the gear-type transmission 46 is set to the disengaged state, a two-wheel drive state is realized in which motive power is transmitted to only the right and left rear wheels 12, and motive power is not transmitted to the right and left front wheels 11. On the other hand, when the clutch mechanism (not shown) is set to the engaged state, a four-wheel drive state is realized in which motive power is transmitted to the right and left rear wheels 12, as well as the right and left front wheels 11.

Figure 3:
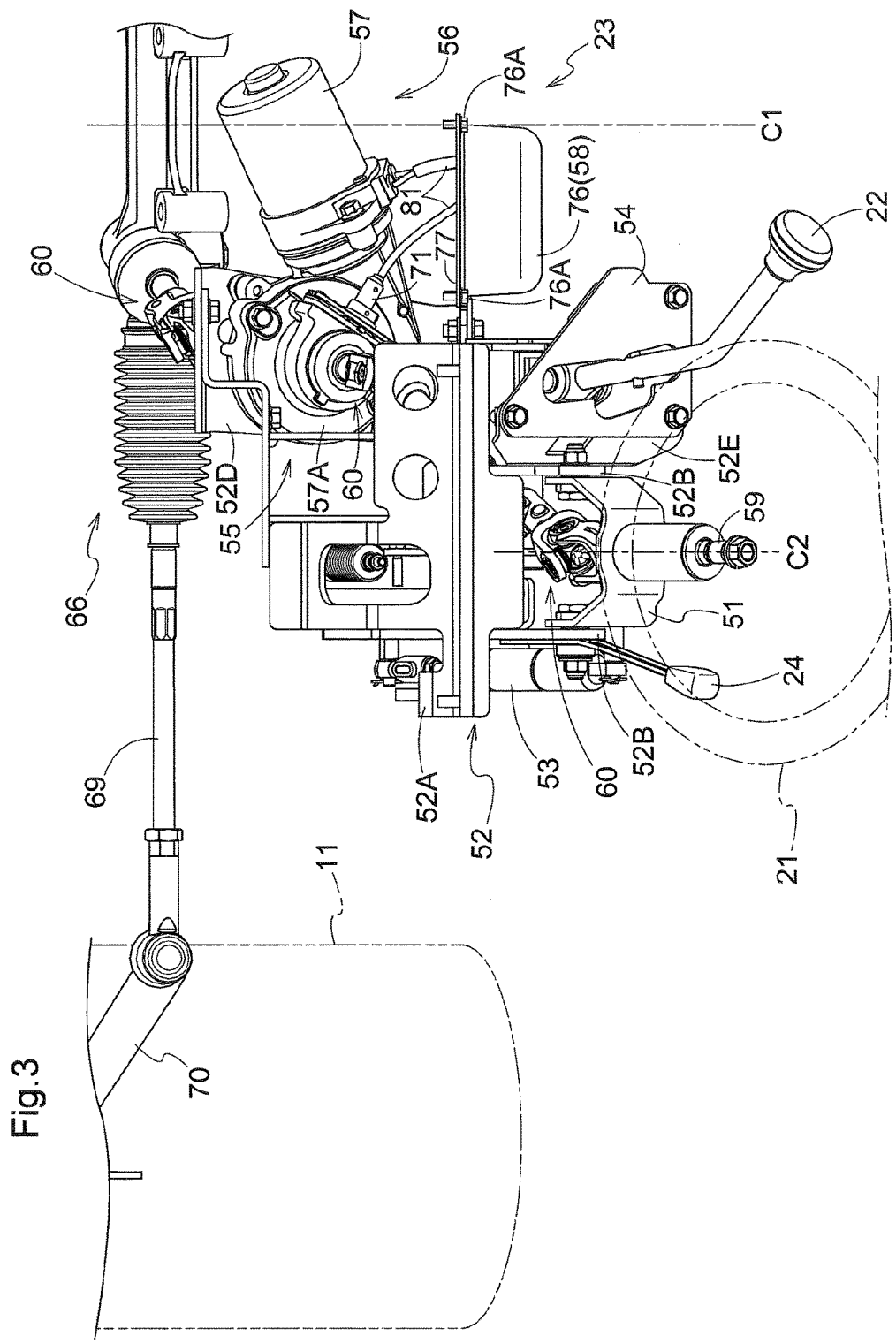
FIG. 3 is a plan view of a region including an electric power steering unit.
Figure 4:
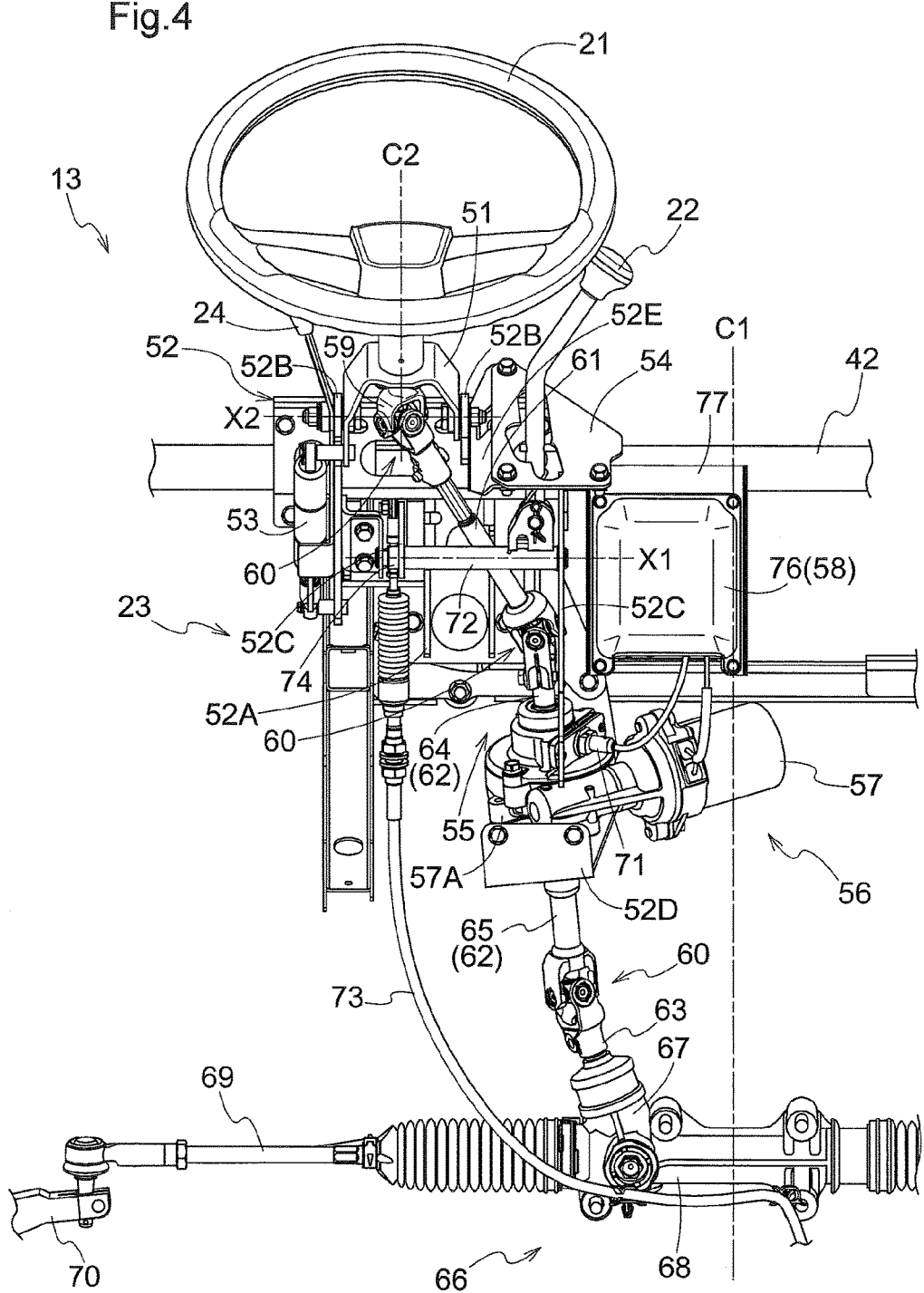
FIG. 4 is a rear view of the region including the electric power steering unit.

As shown in FIGS. 2 to 4, the steering wheel 21 is arranged offset toward one side (the vehicle left side in this embodiment) relative to a vehicle body right/left center C1. The steering wheel 21 is rotatably supported by a steering frame 51. The steering frame 51 is supported by a frame body 52, which is in turn supported by the lateral frame 42 adjacent the vehicle frame.

As shown in FIGS. 3 and 4, etc., the frame body 52 includes: a joining support portion 52A that is joined to and supported by the lateral frame 42; a pair of steering support portions 52B; a pair of rotation shaft support portions 52C; a motor support portion 52D; a guide support portion 52E, etc. Each of the pair of steering support portions 52B, the pair of rotation shaft support portions 52C, the motor support portion 52D and the guide support portion 52E is supported by the joining support portion 52A. The steering frame 51 is supported by the pair of steering support portions 52B to be pivotable about a laterally oriented pivot axis X2 relative to the pair of steering support portions 52B.

As shown in FIGS. 2 to 4, the tilt lever 24 is provided on the left side of the steering frame 51. By moving the tilt lever 24 to a lock position, it is possible to set a locked state in which extension and retraction of a hydraulic pressure cylinder 53 is prevented, and the orientation of the steering wheel 21 is fixed. Also, by moving the tilt lever 24 to an unlock position, it is possible to set an unlocked state in which extension and retraction of the hydraulic pressure cylinder 53 is allowed, and the steering wheel 21 is pivotable about the lateral pivot axis X2 to change the orientation thereof. In this way, by operating the tilt lever 24, the steering wheel 21 is pivoted about the lateral pivot axis X2 to change the orientation thereof, and thus change the steering wheel 21 to a desired angular orientation.

As shown in FIGS. 2 to 4, the speed change lever 22 is provided on the left side of the steering frame 51. A guide member 54 for guiding the speed change lever 22 is supported by the guide support portion 52E of the frame body 52.

Electric Power Steering Unit

With reference to FIGS. 3 to 6, etc., the electric power steering unit 23 has a so-called column assist type of configuration. The electric power steering unit 23 includes a link mechanism 55 and an assist device 56. The assist device 56 includes: an electric motor 57 that is driven by electric power from a battery (not shown) or the like; a speed reducer mechanism 57A that reduces the speed of output from the electric motor 57; and a control device 58 that controls the electric motor 57. The control device 58 comprises an ECU (Electronic Control Unit). The electric motor 57 and the speed reducer mechanism 57A are supported by the motor support portion 52D of the frame body 52. The control device 58 is supported by the lateral frame 42.

The link mechanism 55 is operably connected to the steering wheel 21, and extends from a right/left center C2 side of the steering wheel 21 toward the vehicle body right/left center C1 side, to be operably connected to the front wheel 11 side. The link mechanism 55 is operably connected to a rotation operation shaft 59 of the steering wheel 21 via a universal joint 60.

The link mechanism 55 includes a plurality of link members that are operably connected to one another via the universal joint 60. The link members include: a first link member 61 that is operably connected to the rotation operation shaft 59 of the steering wheel 21; a second link member 62 that is operably connected to the lower end portion side of the first link member 61; and a third link member 63 that is operably connected to the lower end portion side of the second link member 62. The third link member 63 is operably connected to a rack and pinion mechanism 66. The first link member 61 and the second link member 62 are operably connected to each other via the universal joint 60. The second link member 62 and the third link member 63 are operably connected to each other via the universal joint 60.

The second link member 62 includes a steering-side rotation shaft 64 and a rack-side rotation shaft 65. The steering-side rotation shaft 64 is rotated in response to a rotation operation of the steering wheel 21. Also, the rack-side rotation shaft 65 is rotated under the drive force of the electric motor 57 in accordance with a rotation operation of the steering-side rotation shaft 64. Motive power is outputted to the steering-side rotation shaft 64 after the speed of output from the electric motor 57 is reduced by the speed reducer mechanism 57A.

As shown in FIGS. 3 to 6 and the like, the rack and pinion mechanism 66 is linked to the link mechanism 55, and is operably connected to the front axle 50 (one example of an "axle") that drives the front wheels 11.

In other words, the steering wheel 21 is mechanically connected to the rack and pinion mechanism 66 via the link mechanism 55.

As shown in FIGS. 3 and 4, with respect to the vehicle body right/left direction, the right/left center of the rack and pinion mechanism 66 is located at approximately the same position as the vehicle body right/left center C1.

As shown in FIGS. 4, 5, etc., the rack and pinion mechanism 66 includes: a pinion gear portion 67 that operates in unison with the third link member 63; a rack portion 68 that is meshed with the pinion gear portion 67; and rack bars 69 that extend to the right and left from the rack portion 68. Knuckle arms 70 fixed to the front wheels 11 are operably connected to the respective outer end portions of the rack bars 69 to be rotatable relative thereto. The rack portion 68 is driven by operation of the pinion gear portion 67, and thus the rack bars 69 move in the vehicle body right/left direction. In response to movement of the rack bars 69, the knuckle arms 70 are pivoted to change the steering angle of the front wheels 11, respectively.

The assist device 56 is located downward of the first link member 61, and is configured to supply assistive motive power to the second link member 62. The assist device 56 is operable to supply assistive motive power to the link mechanism 55 in accordance with operation of the steering wheel 21. More specifically, a rotation operation amount and a rotation operation speed of the steering-side rotation shaft 64 of the second link member 62 are detected by a rotation sensor 71, which is constituted by a potentiometer. Based on the information detected by the rotation sensor 71, the control device 58 calculates an assist amount, and drives the electric motor 57 in accordance with the calculated assist amount. Then, the rack-side rotation shaft 65 is rotated under the motive power that has been subjected to speed reduction by the speed reducer mechanism 57A.

Speed Change Lever

As shown in FIGS. 3, 4, etc., the speed change lever 22 is arranged on the right side of the steering wheel 21. Specifically, the speed change lever 22 is arranged adjacent the vehicle body right/left center C1 in the vicinity of the steering wheel 21. In other words, the speed change lever 22 and the tilt lever 24 are distributed and arranged on the right and left sides, respectively, across the right/left center C2 of the steering wheel 21.

As shown in FIGS. 4 to 6, etc., a rotation shaft 72 is operably connected to the swing base end portion of the speed change lever 22. The rotation shaft 72 is constituted by a pipe member that has a circular cross-section. The right end portion side of the rotation shaft 72 is operably connected to the pivot base end portion of the speed change lever 22. The rotation shaft 72 is rotatably supported at both ends to the pair of rotation shaft support portions 52C of the frame body 52. The rotation shaft 72 is operably connected to the speed change lever 22, and is rotatable about a right/left axis X1 that extends in the vehicle body right/left direction. A control cable 73 is provided on the left end portion side of the rotation shaft 72.

As shown in FIG. 4, a base end portion 74 of the control cable 73 is operably connected to the left end portion side of the rotation shaft 72. The control cable 73 is linked to the gear-type transmission 46 in the transmission case 45. The control cable 73 is arranged to pass through a space rearward of the rack and pinion mechanism 66. The base end portion 74 of the control cable 73 is more offset toward the vehicle left side than the assist device 56 in the vehicle body right/left direction.

As shown in FIG. 4, the first link member 61 of the link mechanism 55 is arranged to pass through a space between the rotation shaft 72 and the joining support portion 52A of the frame body 52.

As shown in FIGS. 4 and 5, when the speed change lever 22 pivots about the right/left axis X1, the rotation shaft 72 rotates about the right/left axis X1, and a pivot link 75, which is joined to the rotation shaft 72, is pivoted. Then, the control cable 73 is pushed/pulled by the pivot link 75, and thus speed change operations of the gear-type transmission 46 are performed. The control cable 73 is arranged so as to pass below the driver section 13 and arrive at the gear-type transmission 46.

Relationship Between Electric Power Steering Unit and Speed Change Lever

As shown in FIG. 4, the rotation shaft 72, which is operably connected to the speed change lever 22, is arranged so as to extend laterally in the vicinity of the first link member 61 of the link mechanism 55. The electric motor 57 and the control device 58 are arranged on the side of the link mechanism 55 that is opposite to the control cable 73.

Arrangement of Control Device

Figure 7:
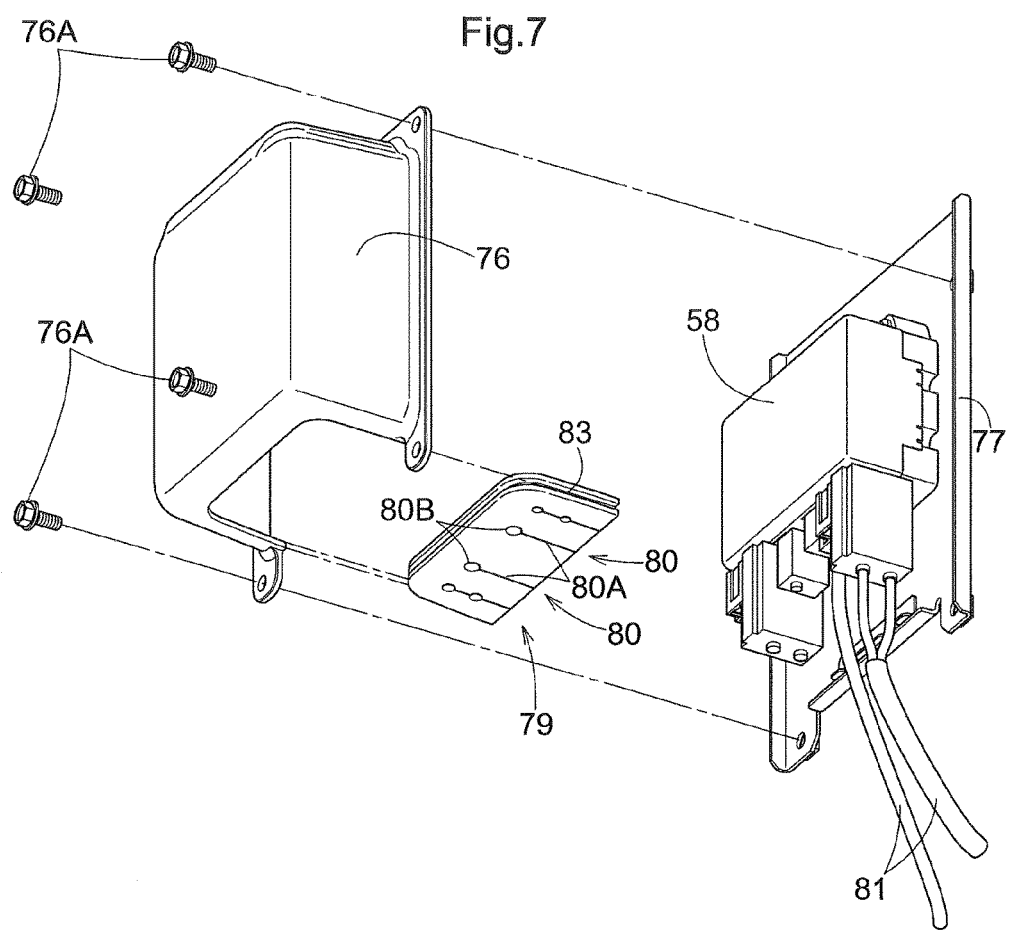
FIG. 7 is a perspective view of a region including a control device.

As shown in FIG. 6, the control device 58 is arranged under the driver panel 20, which is located rearward of the front hood 26. As shown in FIG. 7, etc., a cover 76 is provided so as to cover the control device 58. As shown in FIG. 6, the control device 58 is arranged so as to be rearward of the radiator cover 30 and forward of the driver panel 20. The radiator cover 30 prevents air, that have cooled the radiator 27, from flowing to the control device 58 side, so that water being splashed from ahead is blocked by the radiator cover 30 to prevent such water from coming into contact with the control device 58. Also, the driver panel 20 prevents the intrusion of water and the like from the driver section 13 side to the control device 58 side.

Control Device Cover

As shown in FIG. 7, the control device 58 is attached to a support stay 77 by bolt-connection or the like. The cover 76 formed of resin and a sealing member 79 formed of rubber are attached to the support stay 77. With the cover 76 and the sealing member 79 attached to the support stay 77, the lateral sides, upper side and rear side of the control device 58 are shielded with the cover 76, while the lower side of the control device 58 is blocked by the sealing member 79.

Procedures for attaching the cover 76 will be described below.

First, the upper end portion of the support stay 77, to which the control device 58 is attached, is fixed by welding to the lateral frame 42, thus positioning the support stay 77. Next, electrical wire portions 81, which are to be connected to the control device 58 for transmitting electrical signals and electric power to the control device 58, are tucked into slit portions 80 of the sealing member 79. Each slit portion 80 has a slit 80A extending and opened to the edge portion of the sealing member 79; and a hole portion 80B whose diameter conforms to the diameter of the electrical wire portions 81. Then, the cover 76 is joined to the support stay 77 with using fasteners 76A such as bolts, whereby the entirety of the control device 58 is covered with the cover 76, the sealing member 79 and the support stay 77.

As shown in FIG. 7, a groove portion 83 is formed in the outer peripheral portion of the sealing member 79, and a fitting edge portion 84, which is located at the lower end portion of the cover 76, is fitted into the groove portion 83. Accordingly, while allowing exposure of the electrical wire portions 81 to the outside of the cover 76, the outer sides of the control device 58 can be covered without any gaps, so that it is possible to avoid exposure of the control device 58 to water, thus making it possible to prevent internal shorting of the control device 58 due to exposure to water.

Parking Brake

Figure 8:
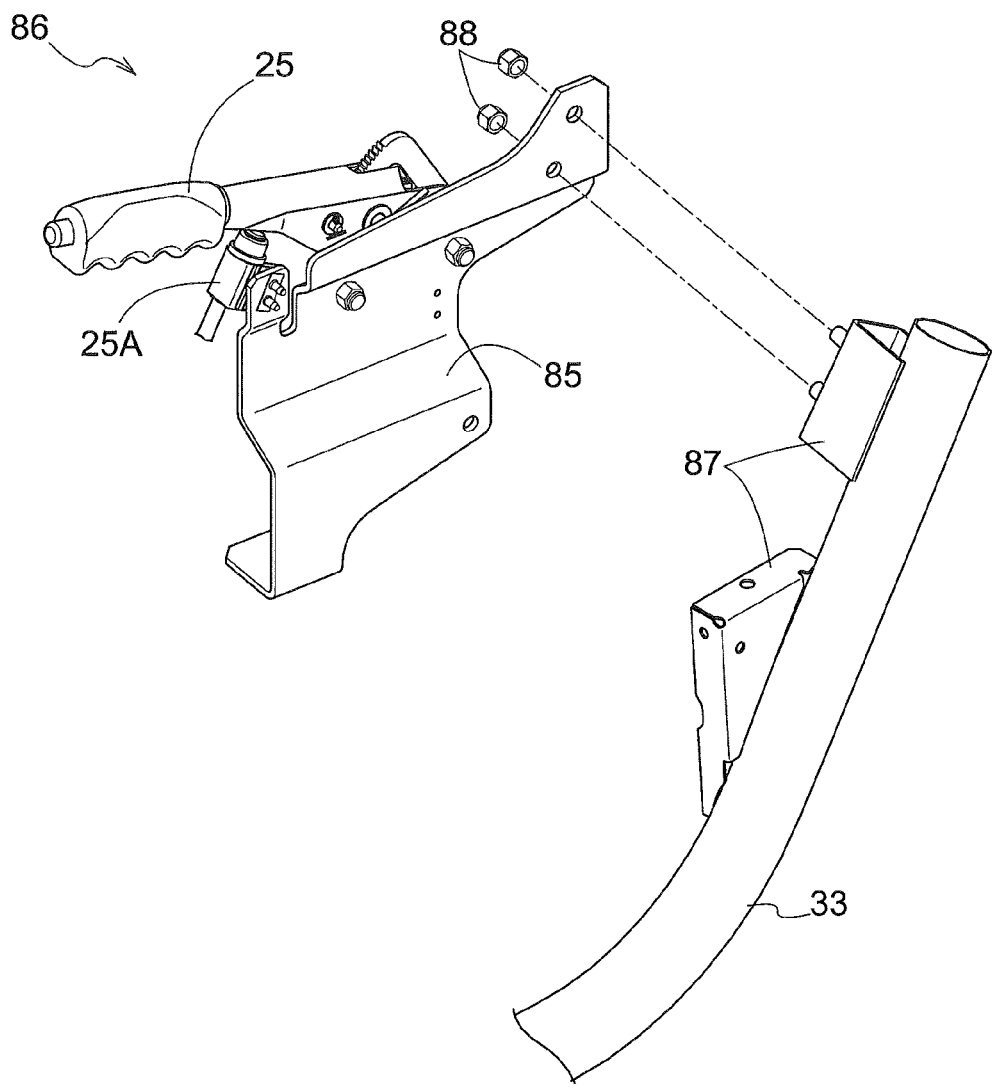
FIG. 8 is a perspective view of a region including a parking lever.

As shown in FIGS. 1 and 2, the parking brake 25 is arranged on one side of the driver seat 17. As shown in FIG. 8, the parking brake 25 is joined to and supported by a support bracket 85; and also a parking switch 25A is supported by the support bracket 85, to detect the ON state of the parking brake 25. The parking brake 25, the support bracket 85 and the parking switch 25A constitute an assembly 86 that has been assembled in advance. Whereby, the parking brake 25 can be easily assembled by attaching the support bracket 85 of the assembly 86 to assembly stays 87, which are provided on the lower frame 33, using fasteners 88 such as bolts and nuts.

Connector Device

Figure 11:
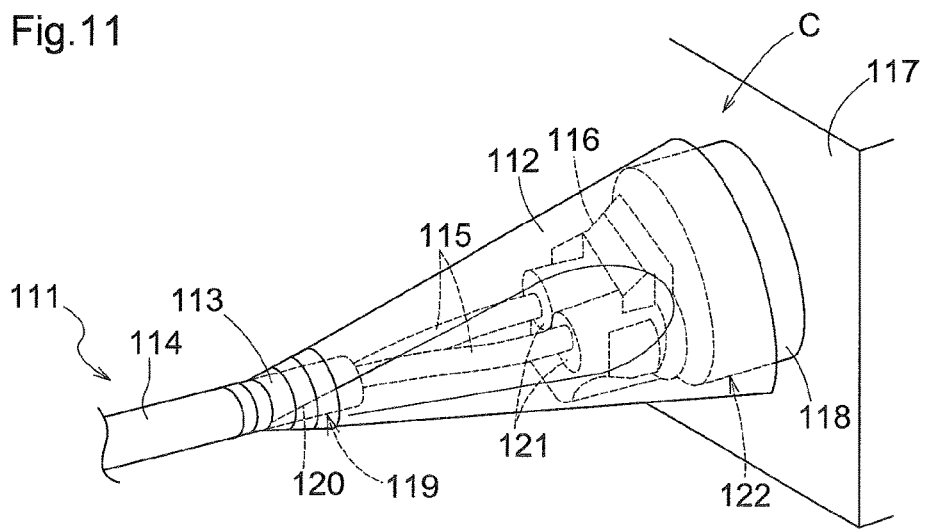
FIG. 11 is a perspective view showing the protective member fixed by a fixing member.

As shown in FIG. 11, a connector structure or connector device C includes a harness 111, a protective member 112 and a fixing member 113.

The harness 111 has a plurality of electrical wire portions 115 each being mostly or substantially covered with a sheath member 114 formed of a thick-walled insulating member; and a connector portion 116 that is formed at tip ends of portions of the electrical wire portions 115 that are not covered with the sheath members 114. Each of the electrical wire portions 115 comprises an electrical wire operable to transmit electric power or electrical signals, and a thin-walled insulating member that covers the outer circumferential side of the electrical wire. The connector portion 116 is configured to be joined to a connected portion 118, to which a target device 117 is connected.

The protective member 112 has flexibility and heat resistance. The protective member 112 is attached to the harness 111 so as to cover the outer peripheral side of the connector portion 116. The protective member 112 is formed longer at least than exposed portions of the electrical wire portions 115 in the tube axial direction. The protective member 112 is constituted by a cylindrical member, and more specifically is constituted by a heat-resistant tube that has flexibility and heat resistance. The protective member 112 is formed by cutting a cylindrical heat-resistant tube to an appropriate length depending on the shape of the harness 111. By using such a heat-resistant tube as the protective member 112, the connector portion 116 of the harness 111 can be more favorably protected against heat, compared to the case where the protective member 112 is a conventional polyvinyl chloride connector cover that does not have heat resistance and is molded in accordance with the shape of the connector portion 116 of the harness 111. Also, it is possible to prevent degradation of the protective member 112 due to heat, and furthermore realize a reduction in production cost. For example, a heat-resistant cross-linked vinyl tube for automobiles provided by Yazaki Corporation (model number VOX 3×4; heat-resistant PVC (polyvinyl chloride) tube formed by electron beam crosslinking) can be used as such a heat-resistant tube, although this is not limitative thereto.

In an abutting portion 119 formed on the sheath member 114 side of the protective member 112, end faces of portions of the protective member 112 are caused to abut against each other while forming a shortcut. The abutting portion 119 is formed by folding a portion of the protective member 112 on the sheath member 114 side. Accordingly, a diameter of the protective member 112 becomes smaller as the protective member 112 extends from the end portion on the connector portion 116 side toward the end portion on the sheath member 114 side.

Also, the fixing member 113 fixes the abutting portion 119 of the protective member 112 to the sheath member 114. The fixing member 113 is constituted by adhesive tape that has heat resistance and flexibility.

Production Process

Figure 9:
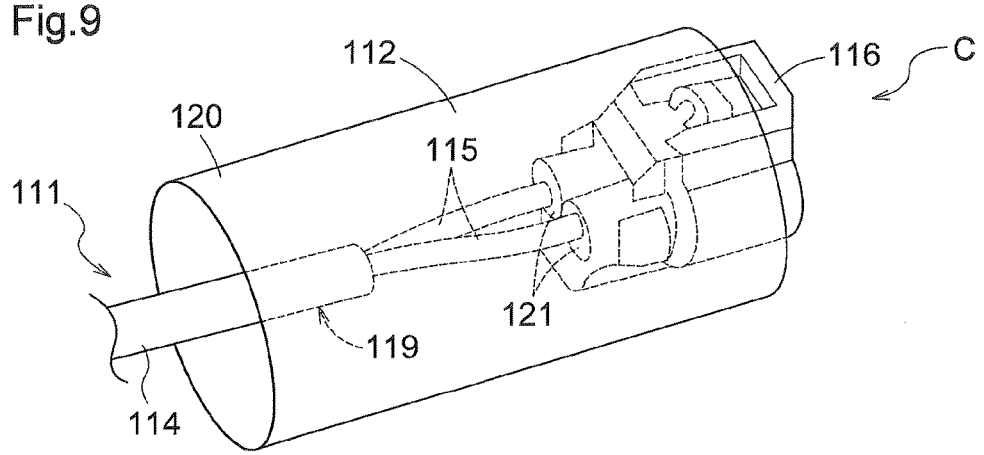
FIG. 9 is a perspective view showing a protective member fitted around a connector portion.

First, as shown in FIG. 9, the protective member 112 is placed at the tip end of the harness 111 so as to surround the tip end region of the sheath member 114, the exposed electrical wire portions 115 and the outer periphery of the connector portion 116.

Figure 10:
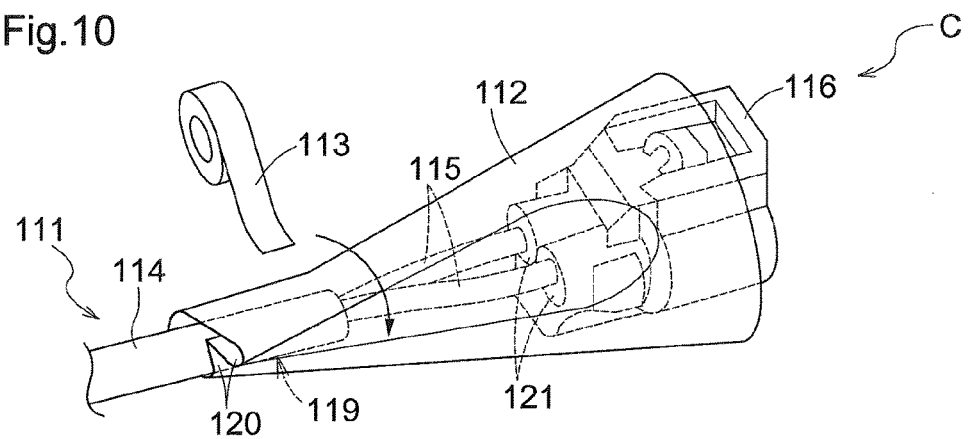
FIG. 10 is a perspective view showing a state in which the protective member has been folded.

Next, as shown in FIG. 10, a portion of the protective member 112 on the sheath member 114 side is bent and folded such that outer circumferential faces 120 of portions of the protective member 112 on the sheath member 114 side may come into abutment against each other, thus forming the abutting portion 119.

Next, as shown in FIG. 11, the fixing member 113 is wrapped around the abutting portion 119 of the protective member 112 and the tip end of the sheath member 114, thus fixing the protective member 112 to the sheath member 114 without any gaps formed between the abutting portion 119 and the sheath member 114. Whereby, the protective member 112 covers and protects the entirety of the exposed electrical wire portions 115, a boundary portion 121 between the exposed electrical wire portions 115 and the connector portion 116, and the outer peripheral side of the connector portion 116.

As shown in FIG. 11, when the connector portion 116 is joined to the connected portion 118 of the target device 117, the outer peripheral side of a connection portion 122 between the connector portion 116 and the connected portion 118 is covered with the protective member 112. Thus, it is possible to sufficiently protect the connector portion 116, the electrical wire portions 115, etc. against heat, water and the like.

The connector device C, in which the connector portion 116, etc. are protected by such a protective member 112, can be favorably used in an environment where the connector device C may be exposed to water, heat or the like.

Application of Connector Device to Multipurpose Vehicle

The above-described connector device C can be included in a multipurpose vehicle V (one example of a "work vehicle") such as that shown in FIG. 4. The multipurpose vehicle V includes a traveling vehicle body operable to travel using the pair of right and left front wheels 11 and the pair of right and left rear wheels 12. The driver section 13 is provided in the fore/aft intermediate region of the traveling vehicle body. The loading platform 14 is provided in the rear region of the traveling vehicle body. A water-cooled gasoline engine (referred to hereinafter as simply the "engine 15") is provided below the loading platform 14 in the traveling vehicle body. The radiator 27 for cooling the engine 15 is arranged under the front hood 26 in the front region of the traveling vehicle body. An upper hose 137 and a lower hose 138 of the radiator 27 pass below the driver section 13 and are connected to the engine 15. The engine 15 includes a water temperature sensor 139 that detects the water temperature of a coolant for cooling the engine 15, in the vicinity of the portion connected to the upper hose 137.

In the connector device C, this water temperature sensor 139 can be applied as the target device 117, for example. The position where the water temperature sensor 139 is arranged is a high-temperature region in the vicinity of the engine 15.

For this reason, the connector device C may be not only exposed to heat from the engine 15, but also exposed to, for example, water splashed from below, or high pressure water during e.g. high-pressure vehicle washing.

However, the connector portion 116 of the connector device C is favorably provided with heat resistance and water resistance by the protective member 112, and therefore even in such an environment, the connector portion 116 of the harness 111 and the like can be sufficiently protected against water and heat from the engine 15. Also, the protective member 112 and the fixing member 113 have heat resistance, and therefore it is possible to avoid degradation of the protective member 112 and the fixing member 113 due to heat from the engine 15.

Other Embodiments

Hereinafter, other embodiments of the present invention will be described. The above embodiment and the following embodiment as will be described below can be appropriately combined as long as no contradiction arises. Note that the scope of the present invention should not be limited by the content(s) of any one of these embodiments.

(1) Although the speed change lever 22 is illustrated as an example of a "control lever" in the above embodiment, the "control lever" is not limited thereto. For example, another "control lever" such as an accelerator lever or a tilt lever may be employed also.

(2) In the above embodiment, the "one side in the vehicle body right/left direction" corresponds to the left side of the vehicle; and the "other side in the vehicle body right/left direction" corresponds to the right side of the vehicle, but there is no limitation to this. For example, the "one side in the vehicle body right/left direction" may correspond to the right side of the vehicle; and the "other side in the vehicle body right/left direction" corresponds to the left side of the vehicle. In other words, a structure that is inverted in the right/left direction from the above embodiment is possible.

(3) The front wheels 11 are illustrated as the "wheels" that are steered in the above embodiment, but there is no limitation to this. Instead thereof, the "wheels" that are steered may be the rear wheels 12.

(4) The link mechanism 55 is arranged so as to pass through the space between the rotation shaft 72 and the frame body 52 in the above embodiment, but there is no limitation to this. Instead thereof, the link mechanism 55 may pass through the space behind the rotation shaft 72, for example.

(5) The second link member 62 is provided with the assist device 56 in the above embodiment, but there is no limitation to this. For example, the first link member 61, the third link member 63 or the rack and pinion mechanism 66 may be provided with the assist device 56, instead of the second link member 62.

(6) The link mechanism 55 is provided with the first link member 61, the second link member 62 and the third link member 63 in the above embodiment, but there is no limitation to this. For example, the number of link members that constitute the link mechanism 55 may be two, or four or more.

(7) Besides the multipurpose vehicle illustrated in the above embodiment, the present invention is also applicable to various types of vehicles such as a tractor, a combine-harvester, a rice planter, or a construction machine.

(8) Although the abutting portion 119 is formed by bending and folding a portion of the protective member 112 on the sheath member 114 side in the above embodiment, there is no limitation to this. For example, another abutting portion may be formed by providing a cutout or a slit at a portion of the protective member 112 on the sheath member 114 side, and then causing end portions of the cutout or slit to abut against each other.

(9) The water temperature sensor 139 is illustrated as an example of the target device 117 to which the connector device C is applied in the above embodiment, but there is no limitation to this. For example, the target device 117 may be another device that is arranged in the vicinity of the engine 15, such as an ignition device, an injector device, a rotation sensor that measures the rotation speed of the engine 15, etc.

(10) The target device 117 to which the connector device C is applied is a device arranged in the vicinity of the engine 15 in the above embodiment, but there is no limitation to this. For example, the target device 117 may be any one of various devices that are arranged distant from the engine 15, including a control device such as an ECU, a key switch device, a cigar socket device, a meter panel, a direction indicator (blinker indicator), a buzzer device, etc.

(11) Although the connector device C is provided in the multipurpose vehicle V, which is one example of a work vehicle, in the above embodiment, there is no limitation to this. For example, the connector device C may be provided in another work vehicle such as a tractor, a mowing machine, a combine-harvester, etc.

What is claimed is:
1. A vehicle comprising:
a steering wheel arranged offset toward one side in a vehicle body right/left direction relative to a vehicle body right/left center; and
an electric power steering unit operable to assist operation of the steering wheel, the electric power steering unit including:
a link mechanism operably connected to the steering wheel, the link mechanism extending from a right/left center side of the steering wheel toward a vehicle body right/left center side to be operably connected to a wheel side,
an assist device operable to supply assistive motive power to the link mechanism in accordance with operation of the steering wheel,
a control lever arranged adjacent the vehicle body right/left center in a vicinity of the steering wheel,
a rotation shaft operably connected to the control lever to be rotatable about a right/left axis that extends in the vehicle body right/left direction, and
a control cable operably connected to the rotation shaft, a base end portion of the control cable being more offset toward the one side in the vehicle body right/left direction than the assist device.
2. The vehicle according to claim 1, wherein the rotation shaft extends in the vehicle body right/left direction across the link mechanism in a vicinity of the link mechanism.
3. The vehicle according to claim 1, further comprising:
a frame body that rotatably supports the rotation shaft, the link mechanism being arranged to pass through a space between the rotation shaft and the frame body.
4. The vehicle according to claim 1, further comprising:
a rack and pinion mechanism that is linked to the link mechanism and is operably connected to an axle of the vehicle, the control cable passing through a space rearward of the rack and pinion mechanism.
5. The vehicle according to claim 1, wherein
the link mechanism includes a plurality of link members that are operably connected via a universal joint, the plurality of link members include a first link member that is operably connected to a rotation operation shaft of the steering wheel, and a second link member that is operably connected to a lower end portion side of the first link member, and the assist device is located below the first link member and is configured to supply assistive motive power to the second link member.

6. The vehicle according to claim 1, wherein the assist device includes an electric motor and a control device that controls the electric motor, and the electric motor and the control device are arranged on a side of the link mechanism that is opposite to the control cable.

7. The vehicle according to claim 6, further comprising:

a front hood;

a driver panel located rearward of the front hood, the control device being arranged under the driver panel; and a cover that covers the control device.

* * * * *